US009651387B2

(12) United States Patent
Hunter et al.

(10) Patent No.: US 9,651,387 B2
(45) Date of Patent: May 16, 2017

(54) PORTABLE NAVIGATION SYSTEM

(75) Inventors: Andrew Hunter, Calgary (CA); Naser El-Sheimy, Calgary (CA); Zainab Syed, Calgary (CA); David Bruce Wright, Calgary (CA); Chris Goodall, Calgary (CA)

(73) Assignee: Invensense, Inc., San Jose, CA (US)

( * ) Notice: Subject to any disclaimer, the term of this patent is extended or adjusted under 35 U.S.C. 154(b) by 1135 days.

(21) Appl. No.: 12/694,879

(22) Filed: Jan. 27, 2010

(65) Prior Publication Data

US 2010/0198511 A1 Aug. 5, 2010

Related U.S. Application Data

(63) Continuation-in-part of application No. 12/168,744, filed on Jul. 7, 2008, now abandoned.
(Continued)

(51) Int. Cl.
*G01C 21/00* (2006.01)
*G01C 21/10* (2006.01)
(Continued)

(52) U.S. Cl.
CPC ........... *G01C 21/28* (2013.01); *G01C 21/265* (2013.01); *G01C 21/3626* (2013.01);
(Continued)

(58) Field of Classification Search
CPC .. G01C 21/265; G01C 21/28; G01C 21/3626; G01S 19/35; G01S 19/49; G01S 19/52; G01S 19/53
(Continued)

(56) References Cited

U.S. PATENT DOCUMENTS 6,421,606 B1 * 7/2002 Asai et al. .................... 701/410
6,522,266 B1 * 2/2003 Soehren et al. .............. 340/988
(Continued)

FOREIGN PATENT DOCUMENTS

WO 2006047525 A1 5/2006

*Primary Examiner* — Thomas G Black
*Assistant Examiner* — Ce Li
(74) *Attorney, Agent, or Firm* — Bay Area Technology Law Group PC

(57) ABSTRACT

A portable navigation module and its method of operation are disclosed for seamlessly providing navigation and positioning information to a user. The module comprises: means, such as a GPS receiver, for receiving a first set of navigational information from an external source, such as satellites; and an inertial sensor unit for generating a second set of navigational information at the module. The navigational information is used by a processor programmed with a core algorithm, to identify the mode of conveyance algorithm and an orientation or misalignment algorithm. The algorithm utilizes the navigational information, aided by the mode of conveyance information and the orientation information, to produce a filtered navigation solution (which comprises position, velocity and attitude). The solution is suitably displayed, preferably on a detachable display unit.

The system has the following attributes: the solution is produced seamlessly, even if one source of navigational information is temporarily out of service; the accuracy of the solution is assisted by use of the mode of conveyance and orientation information; and there is no requirement for the module to be permanently aligned with the direction of movement of the conveyance platform.

11 Claims, 3 Drawing Sheets

Related U.S. Application Data

(60) Provisional application No. 60/958,626, filed on Jul. 5, 2007.

(51) Int. Cl.
*G01S 19/47* (2010.01)
*G01C 21/28* (2006.01)
*G01C 21/26* (2006.01)
*G01C 21/36* (2006.01)
*G01S 19/35* (2010.01)
*G01S 19/49* (2010.01)
*G01S 19/53* (2010.01)
*G01S 19/52* (2010.01)

(52) U.S. Cl.
CPC .............. *G01S 19/35* (2013.01); *G01S 19/49* (2013.01); *G01S 19/53* (2013.01); *G01S 19/52* (2013.01)

(58) Field of Classification Search
USPC ........ 701/468–469, 472–473, 479–481, 500, 701/505, 509, 510
See application file for complete search history.

(56) References Cited

U.S. PATENT DOCUMENTS

| | | | |
|---|---|---|---|
| 6,721,657 B2 * | 4/2004 | Ford | G01C 21/165 340/988 |
| 6,816,783 B2 * | 11/2004 | Hashima et al. | 701/526 |
| 6,850,844 B1 * | 2/2005 | Walters et al. | 701/410 |
| 7,193,559 B2 * | 3/2007 | Ford | G01C 21/165 342/357.32 |
| 7,346,452 B2 * | 3/2008 | Ford | G01C 21/165 342/357.32 |
| 7,509,216 B2 * | 3/2009 | Huddle | G01C 21/16 701/510 |
| 7,706,977 B2 * | 4/2010 | Soehren | 701/541 |
| 8,311,739 B2 * | 11/2012 | Huddle | G01C 21/16 342/357.21 |
| 2002/0198656 A1 * | 12/2002 | Ford | G01C 21/165 701/472 |
| 2004/0150557 A1 * | 8/2004 | Ford | G01C 21/165 342/357.32 |
| 2004/0204840 A1 * | 10/2004 | Hashima et al. | 701/209 |
| 2005/0033200 A1 * | 2/2005 | Soehren et al. | 600/595 |
| 2005/0060093 A1 * | 3/2005 | Ford | G01C 21/165 701/472 |
| 2006/0089786 A1 * | 4/2006 | Soehren | 701/200 |
| 2007/0038364 A1 * | 2/2007 | Lee et al. | 701/200 |
| 2009/0037107 A1 * | 2/2009 | Huddle | G01C 25/005 701/510 |
| 2009/0204323 A1 * | 8/2009 | Huddle | G01C 21/16 701/501 |
| 2009/0254279 A1 * | 10/2009 | Han et al. | 701/221 |
| 2010/0019963 A1 * | 1/2010 | Gao et al. | 342/357.04 |
| 2011/0029277 A1 * | 2/2011 | Chowdhary et al. | 702/150 |

* cited by examiner

PORTABLE NAVIGATION SYSTEM

PRIORITY

This application is a continuation-in-part of application Ser. No. 12/168,744 filed Jul. 7, 2008. This application claims the benefit of the filing date of U.S. Provisional Application No. 60/958,626, filed Jul. 5, 2007. The content of these applications are incorporated herein by reference.

FIELD OF THE INVENTION

The present invention relates generally to a portable navigation system adapted for use by an individual both when on foot or in a vehicle or on a moving platform, for the purpose of navigation and positioning.

BACKGROUND OF THE INVENTION

The common practice in the field of portable navigation is the use of GPS-only systems. The position and/or velocity information from the GPS receiver is displayed on a digital map to identify the location of the user. However, GPS is not reliable as it needs a direct line of sight to at least four different GPS satellites and the line of sight may be interfered with, for example by trees when in a forest or blocked, for example when in a tunnel.

Inertial sensors are self-contained sensors that sense the changes in accelerations and angular rates of the conveying body. These sensors are sometimes used to bridge the GPS signal outages if they are tethered with the moving body in a well defined orientation. The tethered and well aligned constraints make the device application specific and not user friendly.

Navigation when using an assembly of inertial sensors has heretofore involved the use of different navigation algorithms for different transit/conveyance modes. Consequently, there has been no commercially available system known to us that can provide seamless navigation (position, velocity and attitude) information, when multiple modes of conveyance are involved, due to the fact that different algorithms have been used. More specifically, the on-foot mode of transit is implemented by using pedestrian dead reckoning (PDR) algorithm to avoid the huge drifts associated with the integration of inertial signals. However, PDR requires assumptions that must be satisfied for all type of walking modes. For example, climbing up the stairs require different assumptions for stride length and step detection threshold than going down the stairs. In addition, the in-vehicle navigation mode cannot be implemented using PDR and needs mechanization algorithm. Hence, two algorithms are used for the two most common transit modes. It is important for the system to recognize the appropriate mode of transit to switch between the modes otherwise the system will not work well. A mechanization algorithm for on-foot is not desirable due to the quadratic drift of derived navigation parameters with time. This problem has been resolved in the prior art as follows:

1) Use of wireless only positioning (GPS or cellular signals triangulation) for different transit modes (such as positioning used in iPhone). Wireless positioning has only one algorithm no matter what the mode of transit is. However, as previously stated, wireless signals require line of sight to four different signal sources (such as four GPS satellites in case of GPS positioning) to provide a position. Unfortunately, this condition cannot be satisfied all the time;
2) Use of a physical switch, such as cables or tethering inside a land vehicle, to ensure that mechanization algorithm is used for in-vehicle navigation. If in doubt, such systems use wireless only navigation. If wireless only navigation is unavailable, then the user simply doesn't get the navigation information; or
3) Design separate systems, if seamless positioning using inertial sensors is desired, for on-foot and in-vehicle navigation, to ensure the desired use of the navigation system.

SUMMARY

The challenge is to provide a user-friendly system:
that does not need to be tethered and precisely aligned in either on-foot or on a moving platform mode of transit;
that provides a useful navigation solution for either mode of transit or conveyance, preferably using a single navigation or core algorithm and constraining drifts of the navigation algorithm during on-foot mode, for example by using updates from PDR without any assumptions; and
that is preferably capable of GPS integration along with inertial sensor based positioning without assumptions.

The objective of the present invention is therefore to provide a portable navigation system ('PNS') module adapted to seamlessly produce a navigation solution pertaining to the module, for both in-vehicle (including a moving platform) and on-foot modes of transit.

The PNS module utilizes two independent sources of navigational information. It melds the information, when both sources are available, to produce the navigation solution; or it can produce the solution using the information from only one source, when the information from the other source is temporarily unavailable. Thus the output of the module is seamless or continuous.

More particularly, the PNS module incorporates:
a receiver, such as a GPS receiver, for receiving navigational information from an external source, such as GPS satellites. The receiver produces an output of absolute navigational information pertaining to the module, in the form of signals indicative thereof;
an assembly of sensors for generating navigational information at the module. The sensor assembly produces an output of measured navigational information pertaining to the module, in the form of signals indicative thereof; and
a processor coupled to the receiver and sensor assembly for receiving their signals and programmed to accomplish the following:
determining the mode of conveyance of the module;
determining the orientation of the sensors; and
using the absolute and measured navigational information, together with the mode of conveyance and orientation information, to determine and produce the navigation solution. The solution will provide positioning and heading information of the user and module, such as instantaneous position, velocity and attitude information.

The processor is preferably programmed with:
a mechanization navigation algorithm for converting the sensor measurements to relative navigational information;
a conveyance algorithm for using the composite absolute and relative navigational information to establish the mode of conveyance;

an orientation algorithm for using the composite navigational information to establish the orientation of the sensors; and a core or navigation algorithm for using the composite navigational information, the mode of conveyance information and the orientation information to determine and produce a filtered navigation solution.

By initially determining the mode of conveyance and the orientation of the sensors, the core navigation algorithm is able to select and use appropriate constraints to ameliorate errors (such as drift) arising from the sensors.

By way of example, if the mode of conveyance is determined to be on-foot, the core navigation algorithm can be aided by a pedestrian dead reckoning (PDR) algorithm to limit sensor drift.

Optionally, the navigation solution may be communicated to a display and shown thereon. The display may be part of the module body, or may be separate from and wirelessly connected to the module.

In another aspect, a method is provided for seamlessly producing a navigation solution using a portable navigation system module, comprising:

receiving navigational information at the module from an external source and producing signals indicative thereof;

generating navigational information at the module using sensors and producing signals indicative thereof;

determining the mode of conveyance of the module using navigational information derived from the receiver and sensor signals and producing information indicative thereof;

determining the orientation of the sensors using navigational information derived from the receiver and sensor signals and producing information indicative thereof; and processing and filtering the navigational information, the mode of conveyance information and the orientation information to determine and produce a navigation solution.

Optionally, the filtered navigation solution is displayed, either at the module or at another location.

Broadly stated then, a system is provided which combines:

providing and using a composite of navigational information, derived from an external source and measured at the module with sensors, to determine the mode of conveyance of the module and the orientation of the sensors; and using the composite navigational information, the mode of conveyance information and the orientation information to produce a navigation solution pertaining to the module using an appropriately aided core navigation algorithm.

In the event the navigational information from the external source is temporarily not available, the system produces the solution using only the information measured by the sensors.

DESCRIPTION OF THE PREFERRED EMBODIMENT

Figure 1:
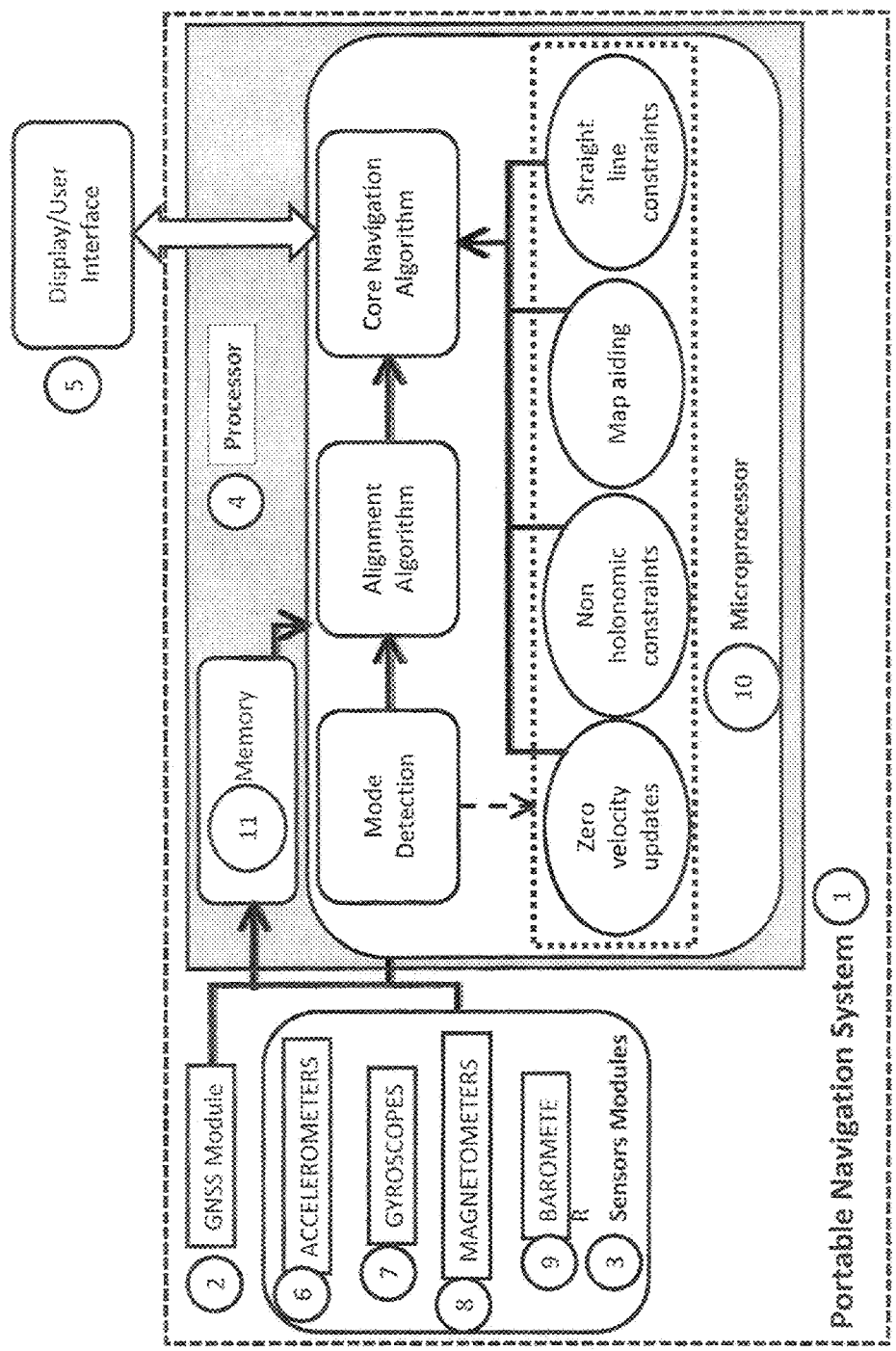
FIG. 1 is a block diagram of a navigation module according to the present invention.
Figure 2:
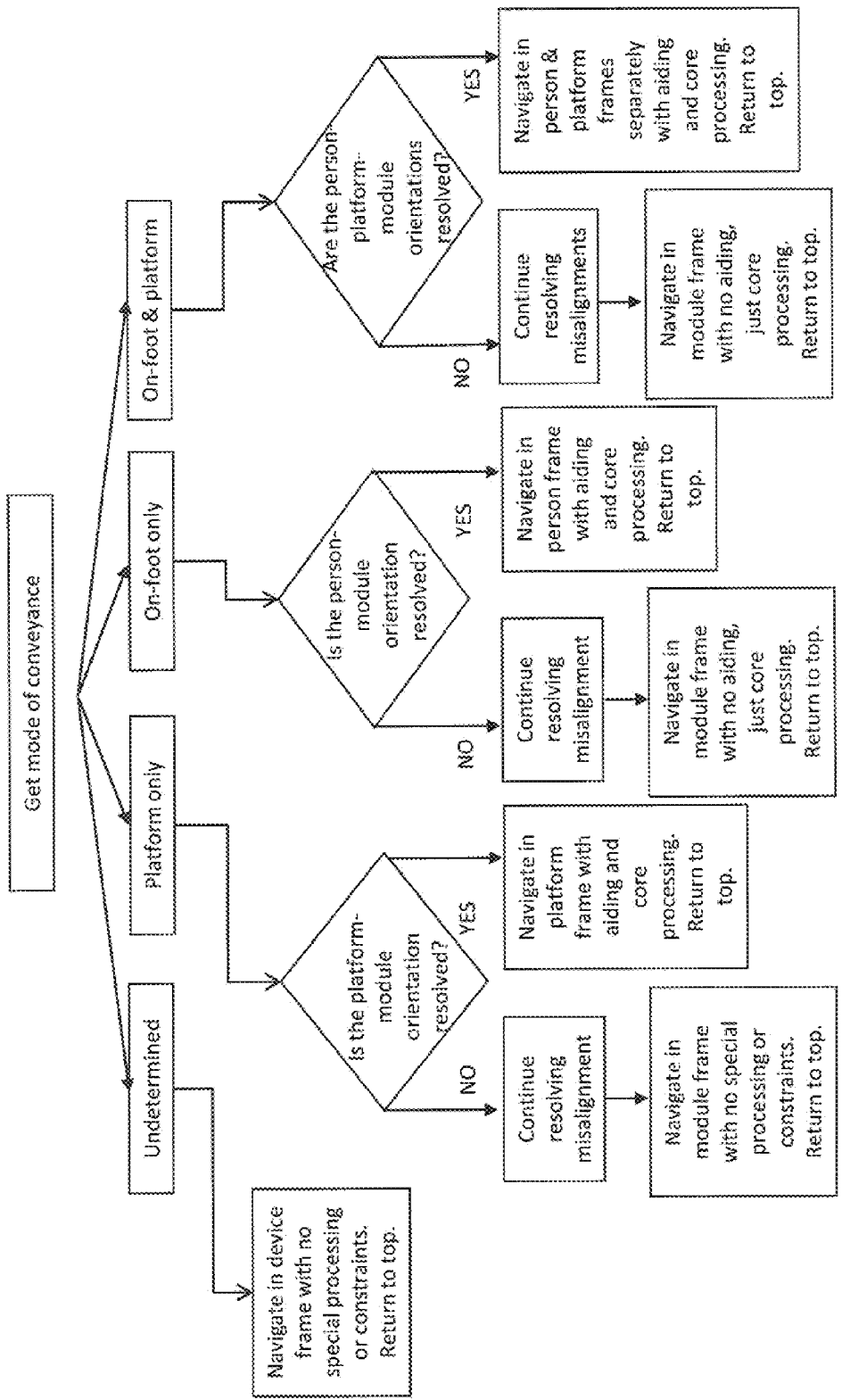
FIG. 2 is a flowchart illustrating the mode of conveyance algorithm.
Figure 3:
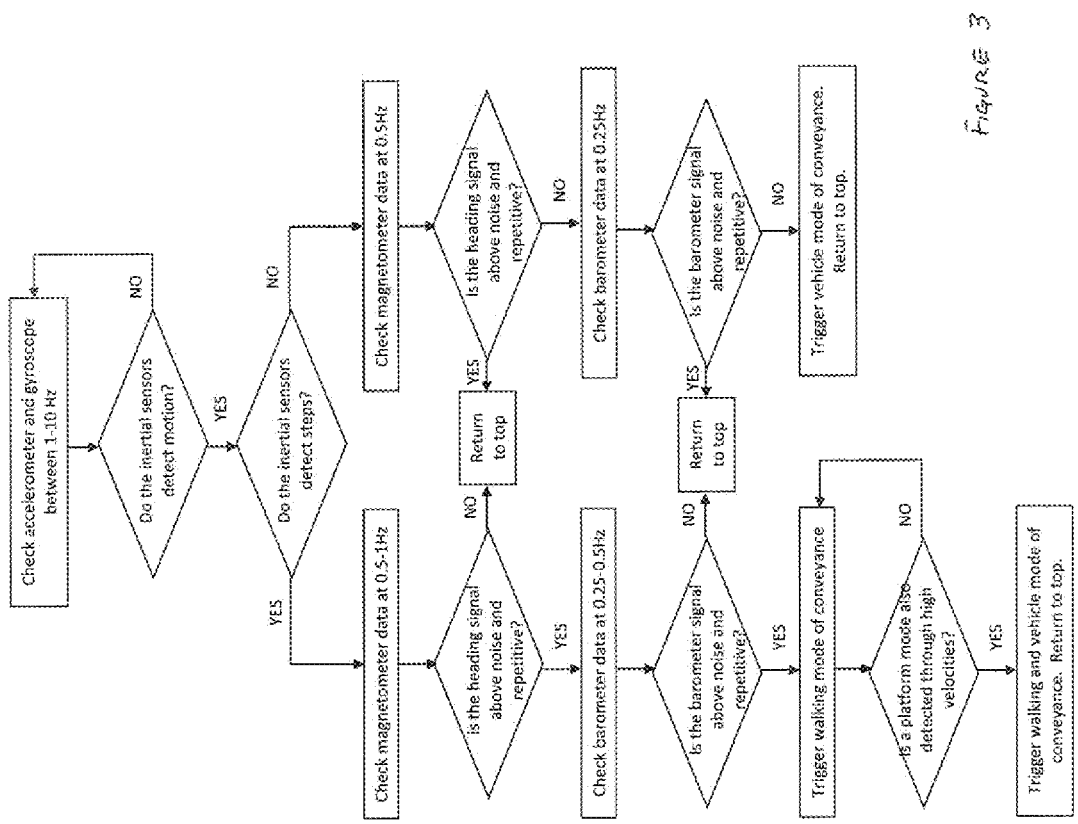
FIG. 3 is a flowchart illustrating the core algorithm.

In the development of the present system, the information contained in the thesis of Dr. Zainab Syed was used. The thesis is available at http://www.ucalgary.ca/engo_webdocs/NES/09.20288.Zainab.Syed.pdf. It provides background and guidance with respect to the system and its disclosure is incorporated herein by reference.

In one embodiment, a portable electronic module 1 is provided which comprises a GPS receiver 2, an assembly 3 of sensors, a processor 4 and a display 5.

The GPS receiver 2 receives navigational information in the form of signals from GPS satellites and converts the information into position and velocity data (referred to as 'absolute navigational information'). The receiver produces the data in the form of signals indicative thereof.

The sensor assembly 3 comprises: accelerometers 6 for measuring module accelerations; gyroscopes 7 for measuring module turning rates; magnetometers 8 for measuring magnetic field strength for use in establishing module heading; and a barometer 9 for measuring pressure for use in establishing altitude changes. The sensor assembly 3 generates data indicative of these measurements, in the form of an output of signals. It will be noted that the sensor assembly 3 generates this information at the module. The information so produced is used to compute 'relative navigational information' pertaining to the module.

As a minimum, the sensor assembly 3 may get by with inertial sensors, namely two accelerometers for monitoring forward/backward and lateral directions and a vertical gyroscope for monitoring heading rate. However, a full complement of: three accelerometers (for forward/backward, lateral and vertical accelerations monitoring); and three gyroscopes (two horizontal gyros for measuring roll and pitch, and a vertical gyro for measuring heading) is preferably utilized for the most accurate solution.

The receiver 2 and sensor assembly 3 are coupled to the processor 4 so as to communicate thereto the absolute navigational information and the sensors' data. This may be done using, for example, a Texas Instruments MSP430 family or other basic microcontroller to capture and time synchronize all the sensor data before transferring the data to a higher powered processor such as an ARM9 based unit or other dedicated DSP for the navigation processing.

The processor is programmed with: a mechanization algorithm for converting the sensor data to relative navigational information by using mechanization equations such as are described in section 2.3 of Syed's thesis; a conveyance algorithm for using the composite navigational information to establish the mode of conveyance; an orientation algorithm for using the composite navigational information to establish the orientation of the sensors; and a core algorithm (for example an extended Kalman Filter as discussed in sections 2.4 and 2.5 of Syed's thesis) for using the navigational information, the mode of conveyance information and the orientation information to determine and produce a filtered navigation solution.

As previously stated, the solution is seamless—that is, it is produced continuously even though the GPS may temporarily be inoperative.

In an experimental prototype, the GPS receiver 2 used was an Antaris LEA-4T receiver module; and the sensor assembly 3 comprised: three orthogonal Micro-Electro-Mechanical Systems MEMS accelerometers (model LIS3L02AL, available from ST Microelectronics); three orthogonal MEMS gyroscopes (model LISY300AL, available from ST Microelectronics); three orthogonal magnetometers (model HMC 5843, available from Honeywell); and a barometer (model 1451, available from MSI Sensors).

The processor 4 comprised a micro-processor 10 and memory 11. The micro-processor 10 was programmed as stated to apply the algorithms, which utilized the composite absolute navigational information and sensors data stored in memory buffer.

More particularly, a mechanization algorithm was applied by the processor 4 to the data incoming from the sensor assembly 3, to convert the data to relative navigational information. This was accomplished by applying mechanization equations, trigonometric identities and pressure to height conversion formulas. Guidance in this regard is provided in the Syed thesis where section 2.3 contains information about a mechanization algorithm and heading estimation using magnetometers. The pressure can be changed into height by following the steps provided in Ranta-aho 2003 which can be accessed at http://www.vaisala.com/files/height_calculation.pdf.

Using the available absolute and relative navigational information derived from the receiver 2 and sensor assembly 3, (said information being referred to herein as 'the composite navigational information'), the mode of conveyance algorithm was applied to establish the mode of module conveyance. The mode of conveyance algorithm uses inertial, magnetometer and barometer signals to determine the physical state of the sensor module, i.e., if the module is carried by a person or inside a land vehicle. After the mode of conveyance is established, two distinct alignments were determined, specifically: (1) the alignment between the moving body, for example the user or vehicle, and the module; and (2) the alignment of the moving body in the navigation frame. The former is referred to as the relative alignment or orientation while the latter is referred to as the absolute alignment. The means for accomplishing this utilized an Extended Kalman filter which estimated the misalignment error states between the moving body and the module. The filter used updates from: physical constraints, namely straight line velocity constraints or non holonomic constraints; the GPS measurements; gravity measurements; and zero velocity periods; to converge to the true values. The misalignment Extended Kalman Filter (EKF) used is provided in section 6.2.4 in Syed' s thesis. In conjunction therewith, the core algorithm estimated the errors in the absolute alignment using heading updates taken from the magnetometers and/or derived using instantaneous velocity values from the GPS information.

Following are the details of the algorithms used in the prototype.

For mode detection, the accelerometer and gyroscope information was checked first at the highest frequencies, typically above 1 Hz. The magnetometer information was checked for repetitive attitude changes between 1 and 2 seconds, which would indicate walking. The barometer information was checked over 2 to 4 seconds for repetitive signal changes which would occur during walking due to repetitive height and pressure changes. Lastly, a platform mode was checked based on large velocities of the combined sensor and/or GPS information, beyond what a human could achieve on foot over a non-moving surface. The entire process was always occurring with update rates of 2-4 seconds.

The mode of conveyance could be:
1. Undetermined—in which case the core algorithm was used without aiding from the mode of conveyance;
2. On-foot (for example on the belt or in the hand of a user walking on an immovable object such as a sidewalk); or
3. On-platform (for example, the system was arbitrarily positioned within a vehicle but without attachment to the vehicle);
4. On-foot on a movable platform (for example, a person walking on a moving train or bus). In this case, the navigation was performed for two motions (on-foot motion which is usually low velocity, and platform motion with higher velocity). The two motions, i.e., on-foot and platform motion, were identified on the basis of underlying frequencies using either Fast Fourier Transform (FFT) or wavelets. The navigation core gave precedence to the high velocity platform and computed the navigational information. Although not implemented yet, a separate core algorithm (the second copy of core algorithm) can be used to compute the navigational information of the low velocity on-foot motion depending on microprocessor capabilities. In this case, the two solutions (high and low velocity) will be combined to contribute to the overall navigation solution.

The orientation of the module with respect to the person or platform was also needed, to permit the application of aiding sources and constraints to the navigation core algorithm. A separate orientation algorithm was therefore always running, which provided an estimate of the orientation, along with its perceived accuracy.

The orientation could be:
1. Undetermined;
2. Determined person to module;
3. Determined platform to module; or
4. Determined platform to person to module.

The detail implementation of the orientation of misalignment algorithm used, along with the equations, is given in section 6.2.4 of Syed' s PhD thesis. Furthermore, in the case that the orientation is undetermined, the produced navigation solution will be with respect to the navigation system and will not provide all the information about the person's positioning.

Once the mode of conveyance was established and the standard deviation dropped below pre-defined thresholds for the orientation algorithm, the aiding sources could be applied appropriately. Even after this condition, the orientation algorithm was applied continuously, to determine the module's orientation during the periods of motion, with accurate GPS updates and estimates of roll and pitch when it was stationary.

The following constraints were used in connection with the prototype:
1. Nonholonomic constraints that keep a person or a vehicle moving in a straight line, or prevent the vehicle from jumping off the ground. Both the mode of conveyance and the orientation between the module and the vehicle/person have to be resolved before this constraint can be applied.
2. Level ground constraint for the stride length for on-foot mode of travel.

Appropriate stride lengths can be estimated using either available techniques such as walking frequency or pre-training of the system, and fixed for computations when walking on level ground. The mode of conveyance has to be resolved to apply this stride length constraint for level ground.

The following aids were provided to the core algorithm:
1. Map aiding was applied to both on-foot and in-vehicle modes of conveyance. The mode of conveyance had to be resolved for this position update to use appropriate maps/algorithms.
2. Zero velocity update, where the navigation core algorithm was aided by the physical state of the platform. The algorithm applied no motion as updates to improve the navigation solution. The mode of conveyance needed to be determined to trigger appropriate no-motion constraints for different modes of conveyance.
3. Odometer aiding was also applied during in-vehicle navigation mode, if the signals were available to the processor. The odometer aiding has shown over two times improvements of navigation solution when used with the collected sensor signals. The processing was done in a post-processing configuration.

Variants:

It is contemplated that various equivalent means can be substituted for the following elements:
  Cellular phone, WiFi or Bluetooth piconet positioning capabilities can substitute the GNSS positioning capabilities if GNSS is unavailable; and
  Any type of inertial sensors (not just limited to MEMS based) are potentially useful.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding U.S. Non-Provisional application Ser. No. 12/168,744, filed Jul. 7, 2008, and U.S. Provisional application No. 60/958,626, filed Jul. 5, 2007 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A portable navigation system module within a moving body, the module comprising:
  a) a receiver for receiving navigational information from an external source and producing an output of absolute navigational information pertaining to the module;
  b) an assembly of sensors in the module comprising an accelerometer and a gyroscope for generating navigational information at the module and producing an output in the form of signals indicative thereof; and
  c) a processor coupled to receive the outputs from the receiver and sensor assembly and operative to use the navigational information provided thereby to establish a mode of conveyance of the module and a variable relative orientation between the sensors and the moving body in the form of information indicative thereof,
  wherein the relative orientation is a difference between a frame of the sensors in the module and a frame of the moving body and is obtained from the accelerometer and the gyroscope, using an estimation filter with measurement updates from physical constraints and the absolute navigational information,
  wherein the mode of conveyance comprises the detection of on-foot mode or in-vehicle mode, wherein said detection of on-foot mode or in-vehicle mode uses an analysis of the signals from the accelerometer and the gyroscope along with magnetometer information and barometer information, said processor further being operative to use the outputs of navigational information derived from the receiver and sensors, the mode of conveyance and the relative orientation to determine and produce a navigation solution when the module is in a tethered condition and when the module is in an untethered condition.

2. The module as set forth in claim 1 wherein:
  the receiver is a GPS receiver;
  the sensor assembly comprises three orthogonal accelerometers for measuring module accelerations, three orthogonal gyroscopes for measuring module turning rates, three orthogonal magnetometers for measuring magnetic field strength for use in determining module heading and a barometer for measuring pressure at the module for use in determining altitude changes of the module; and
  the processor is operative to produce the navigation solution seamlessly.

3. The module as set forth in claim 1 wherein:
  the processor uses a core algorithm to process the navigational information and aids the core algorithm using the mode of conveyance and the relative orientation information.

4. The module as set forth in claim 1 wherein:
  the processor uses a core algorithm to process the navigational information and aids the core algorithm with platform specific aiding and constraints using the mode of conveyance and the relative orientation information.

5. The module as set forth in claim 1 wherein the processor is operative to produce the navigation solution automatically and seamlessly in the event that the receiver is temporarily inoperative.

6. The module as set forth in claim 1 wherein the receiver is a GPS receiver and the processor is operative to produce the navigation solution automatically and seamlessly.

7. The module as set forth in claim 1 wherein:
  the receiver is a GPS receiver;
  the accelerometer is for measuring module accelerations and the gyroscope is for measuring module turning rates, and
  wherein the assembly of sensors further comprises a magnetic field strength measuring device suitable for determining module heading and a measuring device suitable for measuring pressure at the module to determine altitude changes of the module; and
  the processor is operative to produce the navigation solution automatically and seamlessly.

8. The module as set forth in claim 1 wherein the processor is programmed to use a conveyance algorithm operative to determine the mode of conveyance, a relative orientation algorithm operative to determine the relative orientation between the sensors and the moving body and a core algorithm operative to determine a filtered navigation solution.

9. The module as set forth in claim 8 wherein:
  the core algorithm is an Extended Kalman filter operative to determine and produce seamlessly a filtered navigation solution.

10. A method for producing a navigation solution using a portable navigation system module within a moving body, the method comprising:
- receiving navigational information at the module from an external source and producing signals indicative thereof;
- generating navigational information at the module using sensors in the module, comprising an accelerometer and a gyroscope, and producing signals indicative thereof;
- determining a mode of conveyance of the module using navigational information derived from sensor signals frequencies or the receiver and sensor signals frequencies and producing information indicative thereof, wherein the mode of conveyance comprises the detection of on-foot mode or in-vehicle mode, wherein said detection of on-foot mode or in-vehicle mode uses an analysis of the signals from the accelerometer and the gyroscope means along with magnetometer information and barometer information;
- determining a variable relative orientation between the sensors and the moving body and producing information indicative thereof, wherein the relative orientation is a difference between a frame of the sensors in the module and a frame of the moving body and is obtained from the accelerometer means and gyroscope means using an estimation filter with measurement updates from physical constraints and absolute navigational information; and
- processing the navigational information, the mode of conveyance information and the relative orientation information as a composite whole to determine and seamlessly produce a filtered navigation solution pertaining to the module when the module is in a tethered condition and when the module is in an untethered condition.

11. A method for producing a navigation solution using a portable navigation system module within a moving body, the method comprising:
- providing and using a composite of navigational information, derived from an external source and measured at the module with sensors in the module, to determine a mode of conveyance of the module and a variable relative orientation between the sensors and the moving body, wherein the relative orientation is a difference between a frame of the sensors in the module and a frame of the moving body and is obtained from the composite of navigational information using an estimation filter with measurement updates from physical constraints and absolute navigation information, wherein the mode of conveyance comprises the detection of on-foot mode or in-vehicle mode based at least in part on uses an analysis of readings from an accelerometer, a gyroscope, a magnetometer and a barometer; and
- using the composite navigational information, the mode of conveyance information and the relative orientation information to seamlessly produce a navigation solution pertaining to the module when the module is in a tethered condition and when the module is in an untethered condition, wherein the navigation solution can be vehicle navigation or on foot navigation.

* * * * *